US012710027B2

(12) United States Patent
Hammerum et al.

(10) Patent No.: US 12,710,027 B2
(45) Date of Patent: Aug. 18, 2026

(54) AZIMUTH-DOMAIN DETECTION OF AN OCCURRING ROTOR IMBALANCE IN A WIND TURBINE

(71) Applicant: VESTAS WIND SYSTEMS A/S, Aarhus N (DK)

(72) Inventors: Keld Hammerum, Hadsten (DK); Christian Jeppesen, Horsens (DK); David Steele, Skanderborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 271 days.

(21) Appl. No.: 18/686,312

(22) PCT Filed: Aug. 23, 2022

(86) PCT No.: PCT/DK2022/050170

§ 371 (c)(1),
(2) Date: Feb. 23, 2024

(87) PCT Pub. No.: WO2023/025362

PCT Pub. Date: Mar. 2, 2023

(65) Prior Publication Data

US 2024/0384705 A1 Nov. 21, 2024

(30) Foreign Application Priority Data

Aug. 23, 2021 (DK) ............................. PA202170419

(51) Int. Cl.
*F03D 17/00* (2016.01)
*F03D 7/02* (2006.01)

(52) U.S. Cl.
CPC ....... *F03D 17/0065* (2023.08); *F03D 7/0224* (2013.01); *F03D 7/0264* (2013.01); *F05B 2260/80* (2013.01)

(58) Field of Classification Search
CPC .... F03D 7/0224; F03D 7/0264; F03D 7/0298; F03D 7/0296; F03D 17/0065;
(Continued)

(56) References Cited

U.S. PATENT DOCUMENTS

2008/0152493 A1 6/2008 Sundermann et al.
2008/0206051 A1 * 8/2008 Wakasa ..................... F03D 9/25 416/41

(Continued)

FOREIGN PATENT DOCUMENTS

DE 102014100126 A1 7/2015
EP 1978246 A1 10/2008

(Continued)

OTHER PUBLICATIONS

KK Wind Solutions, "Rotor imbalance cancellation", Mar. 31, 2016 (Mar. 31, 2016), pp. 1-6.

(Continued)

*Primary Examiner* — Nicholas Klicos
(74) *Attorney, Agent, or Firm* — Patterson + Sheridan, LLP; Gero G. McClellan

(57) ABSTRACT

Systems, methods, and computer program products for monitoring occurring rotor imbalances. A dynamic characteristic sensor determines the value of a dynamic characteristic of a wind turbine, e.g., of a nacelle thereof, such that the dynamic characteristic includes a component aligned with a rotor plane of the rotor. The dynamic characteristic is sampled when the rotor of the wind turbine is at each of a plurality of azimuth angles ($\psi_n$) to produce a sequence of dynamic values ($a(\psi)$). An azimuth-domain transform is applied to the sequence of dynamic values ($a(\psi)$) to generate at least one inverse-angle component ($A(\gamma_k)$). Rotor imbalances are then detected based on the inverse-angle component ($A(\gamma_k)$), such as by comparing a value of the inverse-
(Continued)

angle component ($A(\gamma_k)$) to a threshold, and the rotation of the rotor is stopped.

16 Claims, 6 Drawing Sheets

(58) Field of Classification Search
CPC ............ F05B 2260/80; F05B 2270/326; F05B 2270/807; Y02E 10/72
See application file for complete search history.

(56) References Cited

U.S. PATENT DOCUMENTS

2009/0266160 A1* 10/2009 Jeffrey .................... F03D 17/00 73/455
2014/0167415 A1* 6/2014 Mykhaylyshyn ....... F03D 7/042 290/44
2015/0369218 A1* 12/2015 Stoltenjohannes ... F03D 7/0224 356/138
2017/0241404 A1* 8/2017 Kristoffersen ........ F03D 7/0224
2018/0142676 A1* 5/2018 Pedersen ................. F03D 7/024
2019/0145381 A1 5/2019 Gbadamassi et al.

FOREIGN PATENT DOCUMENTS

EP 3483433 A1 5/2019
EP 3492735 A1 6/2019
WO 2016083503 A1 6/2016
WO 2017093512 A1 6/2017

OTHER PUBLICATIONS

PCT International Search Report and Written Opinion of the International Searching Authority for Application PCT/DK2022/050170 dated Nov. 23, 2022 (Nov. 23, 2022).
Danish Patent and Trademark Office, 1st Technical Examination including the Search Report and Search Opinion for Application PA 2021 70419 dated Feb. 18, 2022.

* cited by examiner

AZIMUTH-DOMAIN DETECTION OF AN OCCURRING ROTOR IMBALANCE IN A WIND TURBINE

TECHNICAL FIELD

This invention relates generally to wind turbines, and more particularly to detection of an occurring rotor imbalance using data filtered based on rotor azimuth and to stop the rotation of the rotor.

BACKGROUND

Wind turbine rotor blades typically experience significant levels of dynamic loading during operation of the wind turbine. Over the lifetime of the wind turbine, these stresses may cause the rotor blades to fail due to material fatigue, or other causes. In extreme cases, failures may include all or part of a blade separating from the rotor.

In case of major blade damage or blade loss, the now highly imbalanced rotor typically causes the tower and nacelle to experience large external force vectors that rotate in the rotor plane. In wind turbine designs having a fundamental tower frequency close to the nominal rotor speed, the tower may begin to oscillate laterally. Thus, unless the rotor can be stopped within a relatively short period of time from the occurrence of major blade damage or blade loss, the wind turbine may suffer severe structural damage.

Thus, there is a need for improved methods, systems, and software products for reliably detecting suddenly or abruptly occurring rotor imbalances on wind turbines and subsequently stop the rotation of the rotor in a controlled and safe manner.

EP34927735 A1 discloses determining a static unbalance of a rotor of a wind turbine based on obtaining determining a location-dependent angle acceleration and torque as a function of azimuth position of the rotor.

SUMMARY

In an aspect of the invention, a method for detecting an occurring imbalance in a pitchable rotor of a wind turbine during operation is provided. The method includes measuring a dynamic characteristic of the wind turbine, defining a sequence of dynamic values by sampling the dynamic characteristic when the rotor is at each of a plurality of azimuth angles, the sequence of dynamic values includes dynamic values obtained for the immediate at least one full rotation prior to a current azimuth angle of the rotor, applying an azimuth-domain transform to the sequence of dynamic values to generate at least one inverse-angle component, detecting the imbalance based on the at least one inverse-angle component, and initiating a pitching of the pitchable rotor to stop the rotation of the rotor.

It is important to detect quickly an occurring imbalance of a rotor, such as sudden or abruptly occurring rotor imbalances during operation, and subsequently bring the rotor to a safe and controlled stop. In this context, a stopped rotor does not imply a mechanical braking of the rotor, or a complete stop of the rotor, but refer to a rotor where the rotor speed is reduced below a low speed threshold. The rotor speed reduction is obtained by pitching of the pitchable rotor, at least for rotor blades with a functioning pitch system. A the pitchable rotor is a rotor comprising pitchable rotor blades. A rotor may have a static imbalance which can be corrected in different ways, hereunder adding a balance weight to one or more blades. An occurring imbalance is an imbalance which occur during operation. The occurring imbalance occur dynamically and introduce an imbalance of the rotor during operation.

An advantage of the present invention is that once a severe imbalance of the rotor is detectable in a dynamic characteristic of the wind turbine, there is a large risk that the wind turbine is close to a catastrophic event, such as a tower collapse or dis-integration of the rotor. An azimuth-domain transform only requires a single full rotation to show a significant rotor imbalance, and by detecting the dynamic characteristic based on azimuth angles, a potential severe imbalance can be detected fast.

A detected imbalance of the rotor implies a significant imbalance in the rotor, such as an imbalance above a predetermined level or with a rate of change above a predetermined level.

Such significant imbalance may be obtained using different approaches.

In an embodiment of the invention, the at least one inverse-angle component may be a fundamental inverse-angle component, and detecting the imbalance may further include comparing a value of the fundamental inverse-angle component to a fundamental inverse-angle threshold and determining the imbalance exists in response to the value of the fundamental inverse-angle component exceeding the fundamental inverse-angle threshold.

In another embodiment of the invention, the at least one inverse-angle component may be a fundamental inverse-angle component, and detecting the imbalance may further include determining a difference between a current value of the fundamental inverse-angle component and a previous value of the fundamental inverse-angle component, comparing the difference to a fundamental inverse-angle rate of change threshold, and determining the imbalance exists in response to the value of the difference exceeding the fundamental inverse-angle rate of change threshold.

In another embodiment of the invention, the method may further include updating the sequence of dynamic values by adding a new dynamic value to the sequence of dynamic values and removing an oldest dynamic value from the sequence of dynamic values each time the rotor reaches one of the plurality of azimuth angles.

In another embodiment of the invention, the number of dynamic values in the sequence of dynamic values may be equal to an integer multiple of the number of azimuth angles in one full rotation of the rotor.

In another embodiment of the invention, the dynamic characteristic may include a component aligned with a rotor plane of the rotor, in this manner a dynamically occurring movement of the tower in the lateral direction may be detected using an appropriate sensor.

In another embodiment of the invention, each dynamic value may be a measured acceleration of the nacelle of the wind turbine, in particular a lateral acceleration of the nacelle.

In another embodiment of the invention, the method may further include pitching one or more blades of the rotor toward a feathered position in accordance with a selected pitch trajectory in response to detecting the imbalance. A selected pitch trajectory may be a predefined pitch sequence which defines pitch angles and/or pitch rates to be used during the stopping of the rotor, possibly based on sensor input.

In another embodiment of the invention, the method may further include adjusting a blade pitch rate from a first rate to a second rate higher than the first rate in response to detecting the imbalance. The first pitch rate may be the pitch rate currently used when the imbalance is detected.

In another embodiment, the pitching of the pitchable rotor to stop the rotation of the rotor is handled by a safety control system.

The safety control system may be a dedicated control system. As compared to a production control system which is normally based on generic or standard industrial computing equipment, the safety control system is based on safety certified computing equipment, as well as rigorously tested software. Typically, the safety-related part of the control system is constructed according to the principles given in recognized standards for functional safety. Such standards encompass e.g. ISO 13849, IEC 61508, and IEC 62061.

The control system of the wind turbine maybe split into two subsystems, a production control subsystem and a safety controller subsystem. This division may be physically or logically in any appropriate way.

The method according to the various embodiments of the present invention may be implemented in the safety control system. In another embodiment, at least part of the method of the present invention may be implemented in the normal control system, and once an imbalance is detected the safety system is instructed to bring the rotor to stop.

In another aspect of the invention, a system for detecting an occurring imbalance in a pitchable rotor of a wind turbine is provided. The system includes one or more processors and a memory coupled to the one or more processors. The memory includes program code that, when executed by the one or more processors, causes the system to measure a dynamic characteristic of the wind turbine, define a sequence of dynamic values by sampling the dynamic characteristic when the rotor is at each of a plurality of azimuth angles, the sequence of dynamic values includes dynamic values obtained for the immediate at least one full rotation prior to a current azimuth angle of the rotor, apply an azimuth-domain transform to the sequence of dynamic values to generate at least one inverse-angle component, detect the imbalance based on the at least one inverse-angle component, and initiate a pitching of the pitchable rotor to stop the rotation of the rotor.

Embodiments of the system may be configured to carry out each embodiment of the method according to the first aspect.

In another aspect of the invention, a computer program product for detecting the occurring imbalance in the rotor of the wind turbine is provided. The computer program product includes a non-transitory computer-readable storage medium and program code stored on the non-transitory computer-readable storage medium. The program code is configured so that, when it is executed by one or more processors, the program code causes the one or more processors measure a dynamic characteristic of the wind turbine, define a sequence of dynamic values by sampling the dynamic characteristic when the rotor is at each of a plurality of azimuth angles, the sequence of dynamic values includes dynamic values obtained for the immediate at least one full rotation prior to a current azimuth angle of the rotor, apply an azimuth-domain transform to the sequence of dynamic values to generate at least one inverse-angle component, detect the imbalance based on the at least one inverse-angle component, and initiate a pitching of the pitchable rotor to stop the rotation of the rotor.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

Figure 1:
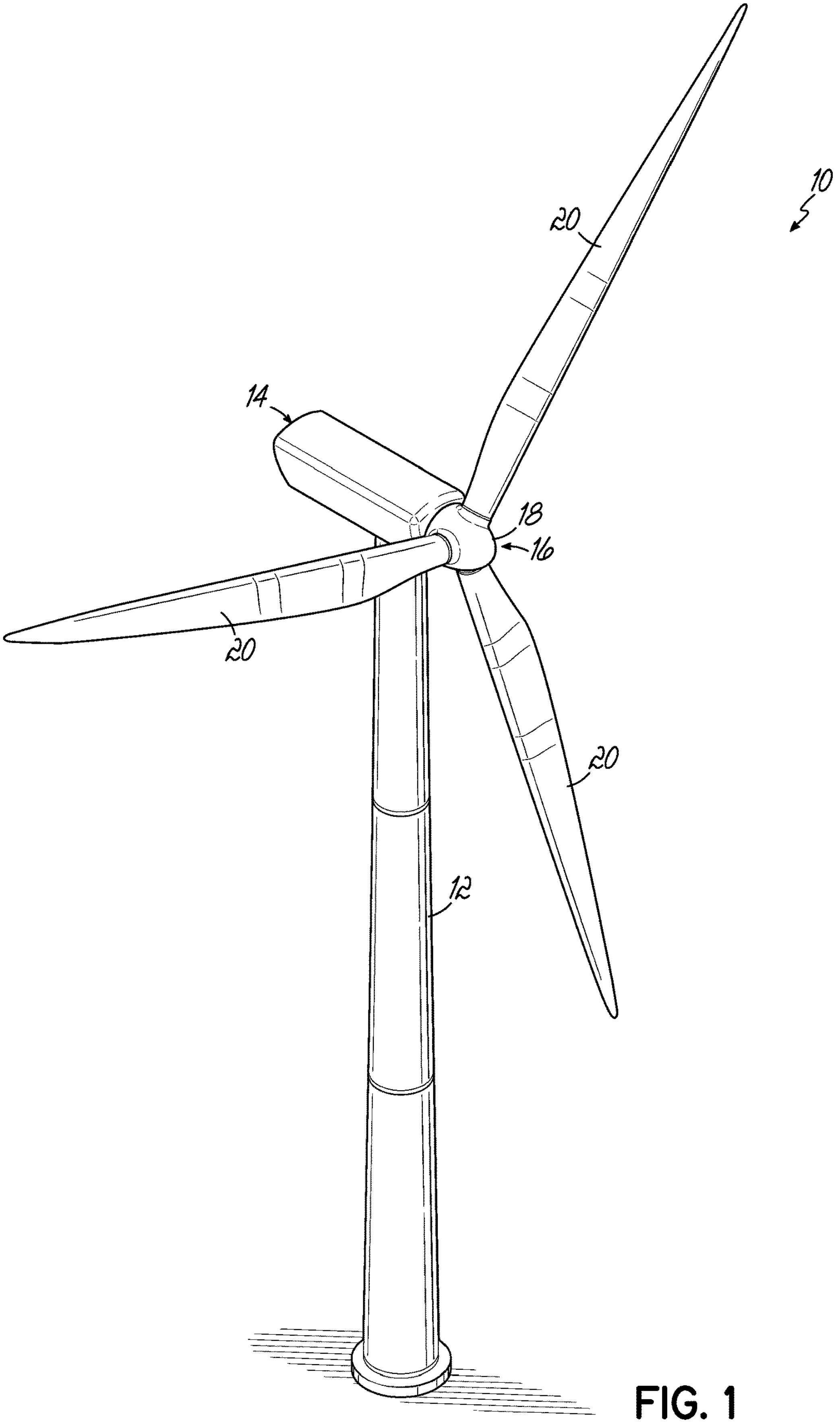
FIG. 1 is a perspective view of an exemplary wind turbine including a tower and a rotor with blades in accordance with an embodiment of the invention.

It should be understood that the appended drawings are not necessarily to scale, and may present a somewhat simplified representation of various features illustrative of the basic principles of the invention. The specific design features of the sequence of operations as disclosed herein, including, for example, specific dimensions, orientations, locations, and shapes of various illustrated components, may be determined in part by the particular intended application and use environment. Certain features of the illustrated embodiments may have been enlarged or distorted relative to others to facilitate visualization and a clear understanding.

DETAILED DESCRIPTION

Embodiments of the invention are directed to systems, methods, and computer program products for detecting imbalances in the rotor of a wind turbine. Data is collected on one or more dynamic characteristics of the wind turbine, such as position, displacement, force, strain, stress levels, movement, velocity, acceleration, or any other dynamic characteristic indicative of wind turbine conditions. This data may be obtained for a component aligned with a rotor plane of the rotor, e.g. a lateral tower top/nacelle acceleration, lateral position data, lateral strain data, etc.

This data is sampled based on rotor azimuthal position, e.g., when the rotor of the wind turbine is at each of a plurality of rotor azimuth positions. A Fourier or other domain transform is applied to the resulting rotor azimuth based sequence of data points to extract information on rotor balance. Compared to conventional, time/frequency-based analysis of signals, the use of an azimuth-domain transform provides the advantage that measured signals including a periodic component related to the period of rotation of the rotor are generated directly from the transform, regardless of rotor speed. Thus, use of the azimuth-domain transform reduces complexity compared to other methods looking at absolute frequency. This provides an efficient way to distinguish rotor imbalance based issues from other types of problems, and select an appropriate safety pitching strategy for addressing excessive rotor imbalance.

One way of identifying rotor imbalance includes obtaining a time series of a dynamic characteristic of the wind turbine, such as a lateral tower top acceleration (e.g., side-to-side acceleration), and estimating the spectral content of the dynamic characteristic at a frequency corresponding to the rotational speed of the rotor. This may be accomplished, for example, by establishing the Fourier transform pair:

$$a(t) \overset{\mathcal{F}}{\rightarrow} A(\omega) \quad \text{Eqn. 1}$$

where a(t) is the measured dynamic characteristic as function of time t (e.g., in seconds), and A(ω) is the Fourier transform of the dynamic characteristic as function of angular frequency w (e.g., in radians/second). In this scheme, the fundamental frequency component would be obtained by setting ω equal to the angular frequency at which the rotor is rotating. In practice, this means that one would need to evaluate the Fourier transform at varying frequencies, depending on rotor speed. This introduces a complication since the speed of the rotor can change over time. Accordingly, variations in rotor speed when each time-based sample of the measured dynamic characteristic is taken may lead to inaccuracies in any fundamental frequency component determined for dynamic characteristic generated by a rotor imbalance.

Starting with azimuth-domain data rather than time-domain data allows the Fourier transform to directly generate inverse-angle components with 2 π periodicity independent of rotor speed. Thus, to determine the magnitude of the periodic components of interest, the dynamic characteristic is sampled as function of azimuth angle ψ, and the following Fourier transform pair established:

$$a(\psi) \overset{\mathcal{F}}{\rightarrow} A(\Upsilon) \quad \text{Eqn. 2}$$

The right side of the equation A(γ) is the Fourier of transform of a(ψ), with γ having the unit of $rad^{-1}$. The magnitude of the 2π periodicity can be obtained directly by setting γ equal to $2\pi^{-1}$ as follows:

$$\left|A\left(\frac{1}{2\pi}\right)\right| \quad \text{Eqn. 3}$$

The output of Equation 3 is independent of the rotor speed. In a discrete-angle representation, this means that only one component of the discrete Fourier transform needs to be computed. For a(ψ) having a domain of 0 to 2π, this corresponds to the first element of the discrete Fourier transform. As described in detail below, the fundamental inverse-angle component may be efficiently computed as a weighted sum of the elements in the buffer holding the dynamic values, with constant weights. The scheme can be generalized to isolate both the fundamental, and harmonic components thereof, by setting γ equal to n/2π, where n =1, 2, 3, . . . .

FIG. 1 illustrates an exemplary wind turbine 10 in accordance with an embodiment of the invention. The wind turbine 10 includes a tower 12, a nacelle 14 disposed at the apex of the tower 12, and a rotor 16 operatively coupled to a generator in the nacelle 14. In addition to the generator, the nacelle 14 typically houses various components needed to convert wind energy into electrical energy and needed to operate and optimize the performance of the wind turbine 10. The tower 12 supports the load presented by the nacelle 14, rotor 16, and other wind turbine components housed inside the nacelle 14.

The rotor 16 includes a hub 18 and one or more (e.g., three) blades 20 attached to the hub 18 at locations distributed about the circumference thereof. The blades 20 project radially outward from the hub 18, and are configured to interact with passing air currents to produce rotational forces that cause the hub 18 to spin about its longitudinal axis. This rotational energy is delivered to the generator housed within the nacelle 14 and converted into electrical power. To optimize performance of the wind turbine 10, the pitch of blades 20 may be adjusted by a pitch system in response to wind speed and other operational conditions.

Figure 2:
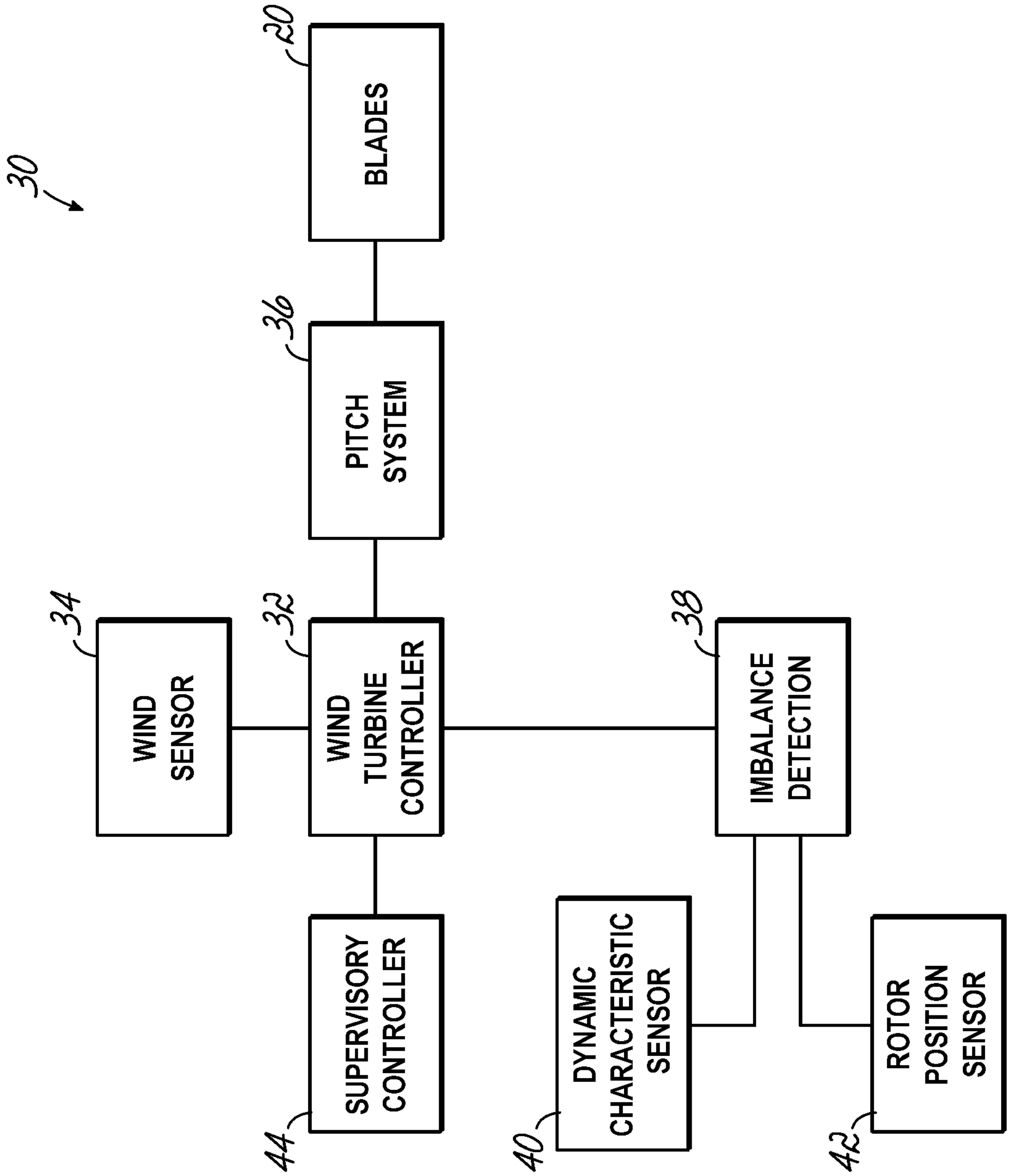
FIG. 2 is a diagrammatic view of a control system including an imbalance detection module and a pitch system that may be used to control the pitch of the blades of FIG. 1.

FIG. 2 illustrates an exemplary control system 30 that may be used to control the wind turbine 10. The control system 30 may include a wind turbine controller 32 in communication with a wind sensor 34, a pitch system 36, an imbalance detection module 38, a dynamic characteristic sensor 40, a rotor position sensor 42, and supervisory controller 44. The dynamic characteristic sensor 40 may include one or more of an accelerometer, a strain gauge, or any other sensor configured to measure position, displacement, force, strain, stress levels, movement, velocity, acceleration, or any other dynamic characteristic indicative of wind turbine conditions.

The supervisory controller 44 may be configured to implement a system-wide control strategy for a group of wind turbines 10 (e.g., a wind farm) that optimizes the collective performance of the wind turbines 10. The supervisory controller 44 may provide the wind turbine controller 32 with a power demand signal indicative of a desired power output to be provided by the wind turbine 10. Under normal operating conditions, the wind turbine controller 32 may generate a pitch command signal based on input from the wind sensor 34 and the power demand signal.

The pitch system 36 may be configured to adjust the pitch of the blades 20 collectively or independently in response to the pitch command signal received from the wind turbine controller 32. During normal operation, the pitch command signal may be generated by a pitch control algorithm that adjusts pitch to maximize power output at wind speeds below the rated output speed, and to maintain rated output power at wind speeds above the rated output speed. Typical pitch speeds during normal operation may be continuously variable within a range of plus-or-minus ten degrees per second. The pitch system 36 may thereby enable the wind turbine controller 32 to control the power output and other operational parameters of the wind turbine 10.

In response to detecting an extreme or unsafe condition, the pitch system 36 may enter a safety mode, e.g. by instructing the safety system to stop the rotation of the rotor. While in safety mode, the pitch system 36 may be configured to pitch the blades 20 at one of a number of selectable pitch rates, e.g., a low pitch rate and a high pitch rate. To this end, the pitch system 36 may include one or more accumulators (e.g., one per blade) that provide hydraulic pressure. The accumulators may be operatively coupled to pitch cylinders by one or more valves, e.g., a low rate valve and a high rate valve. An exemplary low pitch rate resulting from opening the low rate valve may be in a range of zero to five degrees per second, e.g., about one or two degrees per second towards feather. An exemplary high pitch rate resulting from opening the high rate valve may be in a range of three to ten degrees per second, e.g., about five or eight degrees per second towards feather. An exemplary set of low and high pitch rates for a pitch system in safety mode may be 1 degree per second for the low pitch rate, and 5 degrees per second for the high pitch rate.

The valves may be configured to control the pitch in response to signals from the wind turbine controller 32. Each selectable pitch rate may be relatively constant, meaning that pitch rates are fixed within a certain deviation in the order of zero to five percent. Deviations in pitch rate while in safety mode may result from changes in pressure in the accumulators, as well as from changes in the blade pitch angle or the extension of the pitch cylinders during pitching, for example. The pitch system 36 may, as an alternative, include an electrical pitch system that uses electric motors to pitch the blades rather than hydraulic cylinders.

The imbalance detection module 38 may receive data indicative of a dynamic characteristic of the wind turbine 10 from the dynamic characteristic sensor 40, and data indicative of the azimuthal position of the rotor 16 from a rotor position sensor 42. In an exemplary embodiment of the control system 30, the dynamic characteristic sensor 40 may include one or more accelerometers located in one or more of an upper portion of the tower 12 (e.g., the top one third of the tower 12) or the nacelle 14. In this embodiment, the dynamic characteristic sensor 40 may be configured to detect acceleration generally orthogonal to an axis of rotation of the rotor 16, referred to herein as "lateral acceleration". Other ways of sensing dynamic characteristics of the wind turbine 10 may include measuring position or velocity verses time (e.g., using a Global Positioning System (GPS) receiver), determining acceleration based changes in the position or velocity, measuring strain in (or forces acting on) one or more components of the wind turbine 10, etc.

The rotor position sensor 42 may detect the position of the rotor 16 using any suitable sensing device or devices, such as rotary potentiometers, magnetic hall effect sensors, encoders, inductive position sensors, variable differential transformers, or any other suitable devices. The rotor position sensor 42 may also be part of a rotor speed sensing system that enables the controller 32 to monitor and control the speed at which the rotor 16 is rotating as well as determine proper blade pitch settings.

Figure 3:
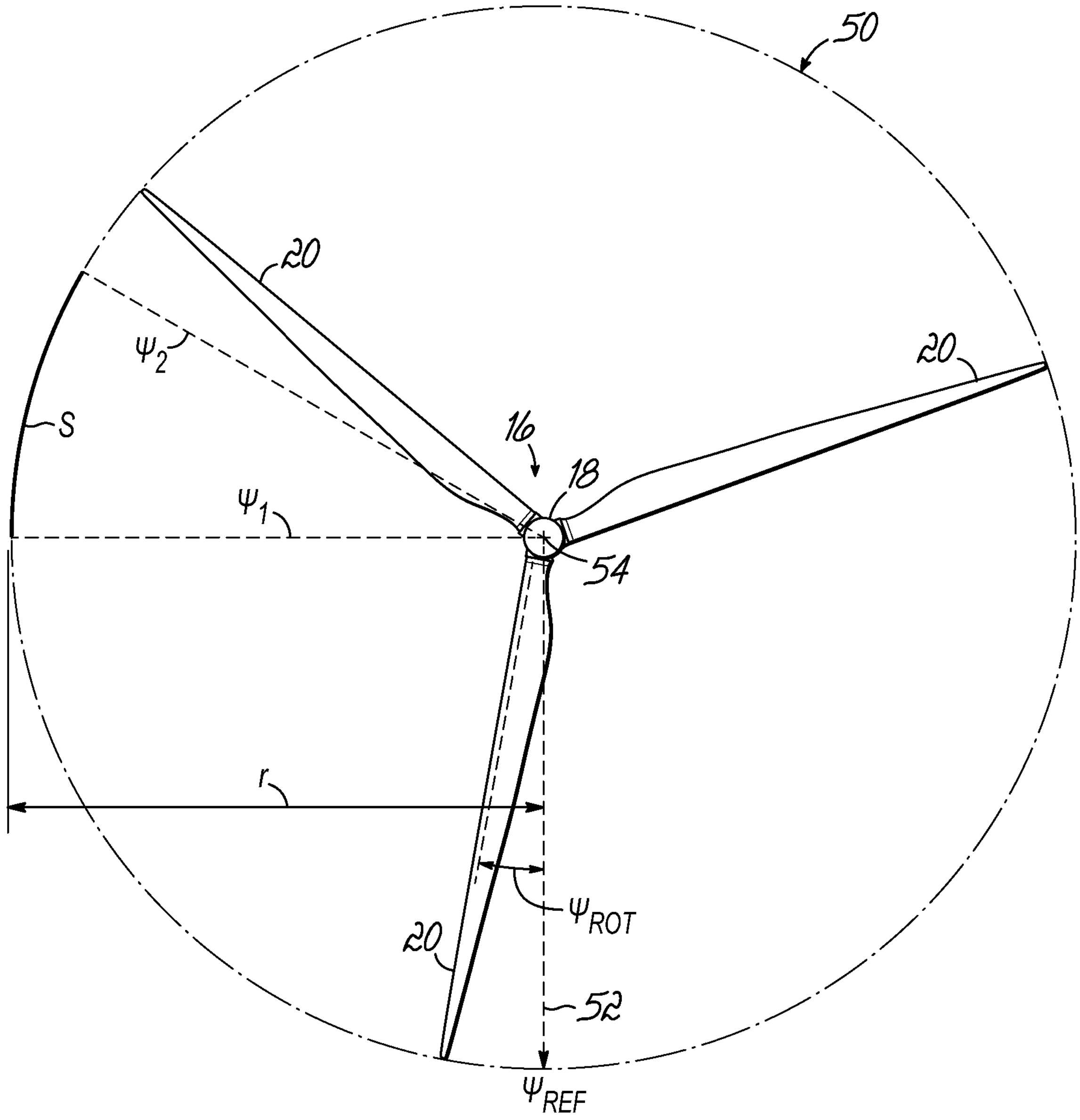
FIG. 3 is a diagrammatic view of a rotor plane in which the rotor of FIG. 1 rotates.

FIG. 3 depicts a rotor plane 50 that is perpendicular to an axis of rotation of the rotor 16 and through which the blades 20 of rotor 16 rotate. The position of the rotor 16 in the rotor plane 50 may be identified by an azimuth angle $\psi_{ROT}$. The azimuth angle $\psi_{ROT}$ of the rotor 16 may be defined by the position of a reference point of the rotor 16 (e.g., one of the blades 20) relative to a fixed reference angle $\psi_{REF}$ within the rotor plane 50. In the depicted embodiment, the reference angle $\psi_{REF}$ is defined by a vector 52 originating at the axis of rotation 54 and pointing downward through the rotor plane 50. For a rotor 16 that rotates in a clockwise direction, the value of the azimuth angle $\psi_{ROT}$ increases as the blade 20 rotates in a clockwise direction away from the reference angle $\psi_{REF}$ as viewed from the front. However, it should be understood that both the position of the reference angle $\psi_{REF}$ and the direction of increasing value of the azimuth angle $\psi$ is arbitrary, and any reference angle and positive direction of rotation may be used.

The angle $\psi$ in radians (rad) between two azimuthal positions $\psi_1$, $\psi_2$ of the rotor is provided by the length of an arc s traveled by a point on the rotor (e.g., a tip of a blade 20) as the rotor 16 rotates from the starting angular position $\psi_1$ to the ending angular position $\psi_2$ divided by the radius r of the arc s, which is the distance between the arc s and the axis of rotation 54. The resulting angle can be represented mathematically by:

$$\psi = \frac{s}{r} \text{ rad} \qquad \text{Eqn. 4}$$

such that one full rotation covers 2π radians. Although angular distances are described herein in terms of radians, it should be understood that angular distances may be described using any suitable unit of angular measurement.

Figure 4:
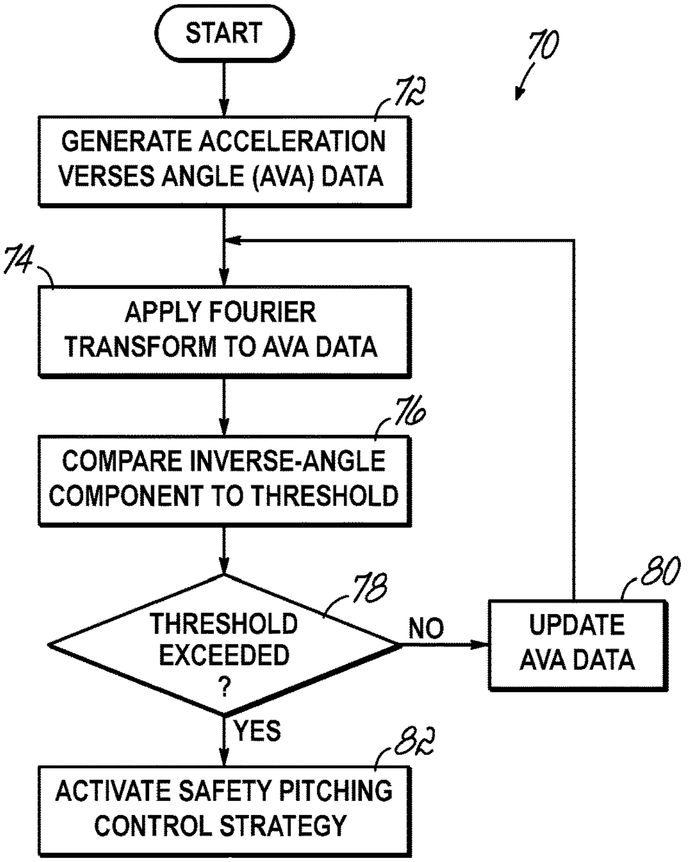
FIG. 4 is a flowchart of a process for determining if the rotor of FIG. 1 has suffered an imbalance causing event.

FIG. 4 depicts a flowchart illustrating an exemplary process 70 that may be executed by the imbalance detection module 38, or any other suitable computer, to determine if the rotor 16 of wind turbine 10 has suffered an imbalance causing event. Exemplary imbalance causing events may include a buildup of ice on a blade 20, damage to the profile of a blade 20, loss of a portion of a blade 20, or anything else that could cause an imbalance, including, but no limited to, imbalances from aerodynamic forces and imbalances from changes in mass.

In block 72, the process 70 may generate dynamic value verses angle data. This data may be generated in real time, for example, by sampling the value of the dynamic characteristic indicated by the dynamic characteristic sensor 40 in response to the rotor 16 reaching each of a plurality of predetermined azimuth angles $\psi_n$, referred to herein as "sample angles". Each of the sample angles $\psi_n$ may be one of a set sample angles spaced evenly throughout a single rotation of the rotor 16. By way of example, the set of sample angles may be provided by:

$$\psi_S = \{\psi_0, \psi_1, \ldots \psi_{(N-1)}\} \qquad \text{Eqn. 5}$$

where $$\psi_{(n+1)} = \psi_{(n)} + \frac{2\pi}{N} \qquad \text{Eqn. 6}$$

for all sample angles $\psi_n$. A typical value for N may be, for example, N=72.

The resulting dynamic value verses angle data may comprise a sequence of dynamic characteristic values that are each a function of azimuth angle $\psi_n$, as shown below:

$$a(\psi) = \{a(\psi_0), a(\psi_1), \ldots a(\psi_{N-1})\} \qquad \text{Eqn. 7}$$

In block 74, the process 70 may apply a Fourier transform to the dynamic value verses angle data. Applying the Fourier transform to the dynamic value verses angle data may include applying a discrete Fourier transform (DFT) to the sequence of dynamic characteristic values a(ψ) to produce a sequence of inverse-angle components A(γ) as shown below:

$$A(\Upsilon_k) = \sum_{n=0}^{N-1} a(\psi_n) \times e^{-i2\pi\frac{kn}{N}} = \sum_{n=0}^{N-1} a(\psi_n) \times \left[\cos\left(\frac{2\pi}{N}kn\right) - i \times \sin\left(\frac{2\pi}{N}kn\right)\right] \qquad \text{Eqn. 8}$$

Because the Fourier transform transforms the acceleration in the azimuth domain and not in the time domain, dynamic values (e.g., acceleration) due to imbalances in the rotor 16 will produce an inverse-angle component at the value of k corresponding to an inverse-angle of ½π rad$^{-1}$. This inverse-angle component at ½π rad$^{-1}$is referred to herein as the fundamental inverse-angle component. For an input window having a length of 2π radians (e.g., a sequence a(ψ) corresponding to a single rotation of the rotor 16), this means that the only inverse-angle component that needs to be calculated to detect a rotor imbalance is the fundamental inverse-angular component at k=1 (or, since the value of $a(\psi_1)$ is real, the mirror image inverse-angular component at k=(N−1)). The value of $A(\gamma_k)$ for k=1 may be provided by:

$$A(\Upsilon_1)=\sum_{n=0}^{N-1}a(\psi_n)\times e^{-i2\pi\frac{n}{N}}=\sum_{n=0}^{N-1}a(\psi_n)\times\left[\cos\left(\frac{2\pi}{N}n\right)-i\times\sin\left(\frac{2\pi}{N}n\right)\right] \quad \text{Eqn. 9}$$

Because the spacing of the inverse-angle components $A(\gamma_1)$ is the inverse of the input window length, if an input window having a length comprising a number of full rotations is used (e.g., 4π, 6π, 8π, etc.), the fundamental inverse-angular component may be provided by the component having a k value equal to the number of full rotations covered by the input window.

It should be understood that although input windows having a length that is an integer multiple of a full rotation are discussed above, other input window lengths may be used, as long as the sequence of dynamic values includes dynamic values obtained for the immediate, at least substantial part of the, at least one full rotation prior to a current azimuth angle of the rotor. However, the output of the Fourier transform for an input window length that is not an integral multiple of a full rotation may lack an inverse-angle component that aligns exactly with the fundamental inverse-angle. In this case, the method 70 may use the inverse-angle component closest to the fundamental inverse-angle as the "fundamental inverse-angle component". In addition, although the above description has been with reference to a specific DFT, it should be further understood that other domain-transforms, such as the Fast Fourier Transform (FFT) or the Goertzel algorithm, may be used to transform the dynamic value verses angle data into inverse-angle data.

In block 76, the process 70 may compare the value of a selected inverse-angle component (e.g., the fundamental component) to a threshold. This inverse-angle component threshold may be a predetermined threshold, a rate of change threshold, or any other threshold suitable for identifying excessive imbalance in the rotor 16. To determine if the inverse-angle component is exceeding a rate of change threshold, the process may compare the component to one or more previous inverse-angle components. By way of example, each time a new data sample a (In) is added to the sequence of dynamic values (e.g., in response to the rotor 16 advancing to the next sample angle $\psi_n$), the process 70 may recalculate the sequence of inverse-angle components A (γ). By comparing the fundamental inverse-angle component across one or more sequences of inverse-angle components, the process 70 may determine if the fundamental inverse-angle component is growing at a rate indicative of a rotor imbalance that requires immediate attention.

If the threshold is not exceeded ("NO" branch of decision block 78), the process 70 may proceed to block 80, update the dynamic value verses angle data, and return to block 74 to continue monitoring for a rotor imbalance. Updating the dynamic value verses angle data may include adding a new data sample a(ψ) to the dynamic value verses angle data sequence. In response to adding the new data sample a(ψ) to the sequence (e.g., as $a(\psi_N)$), the process 70 may further remove the oldest data sample (e.g., $a(\psi_0)$) from the sequence, and renumber the components so that the updated sequence of dynamic values maintains a consistent structure, e.g., $\{a(\psi_0), a(\psi_1), \ldots a(\psi_{N-1})\}$. This updating of the dynamic value verses angle data sequence may occur each time the rotor 16 advances to the next sample angle $\psi_n$, in which case the dynamic value verses angle data sequence may be implemented using a ring buffer.

If the threshold is exceeded ("YES" branch of decision block 78), the process 70 may proceed to block 82, and activate a safety pitching strategy optimized for cases of excessive rotor imbalance, such as may be caused by full or partial blade loss. This activation may include, for example, overriding the safety pitching strategy blade pitch selection so that the blade pitch is forced to remain at a high pitch rate.

The ability to quickly identify the presence of excessive rotor imbalance may enable safety pitching strategies that minimize forces acting on the tower 12 by altering pitching activity based on the cause of the acceleration threshold exceedance event. This optimization may include determining the amount of lateral acceleration or other dynamic characteristic occurring at the angular frequency of the rotor 16. If the amount of lateral acceleration or other dynamic characteristic within a frequency bin including the angular frequency of the rotor 16 exceeds a pre-defined threshold, safety pitching may be initiated with enforced fast pitching.

Experimental Results

FIGS. 5-8 show the effects of applying imbalance detection and modifying the pitch activity accordingly. The data depicted by the graphs was generated based on aero-elastic time-domain simulations of a 150 meter high wind turbine with a 150 meter rotor. Simulations were performed for a mean wind speed of 10 m/s, and a severe rotor imbalance introduced at t=60 seconds. Plots having dashed lines represent data for a wind turbine without imbalance detection, and plots having solid lines depict data for a wind turbine with imbalance detection in accordance with an embodiment of the invention.

Figure 5:
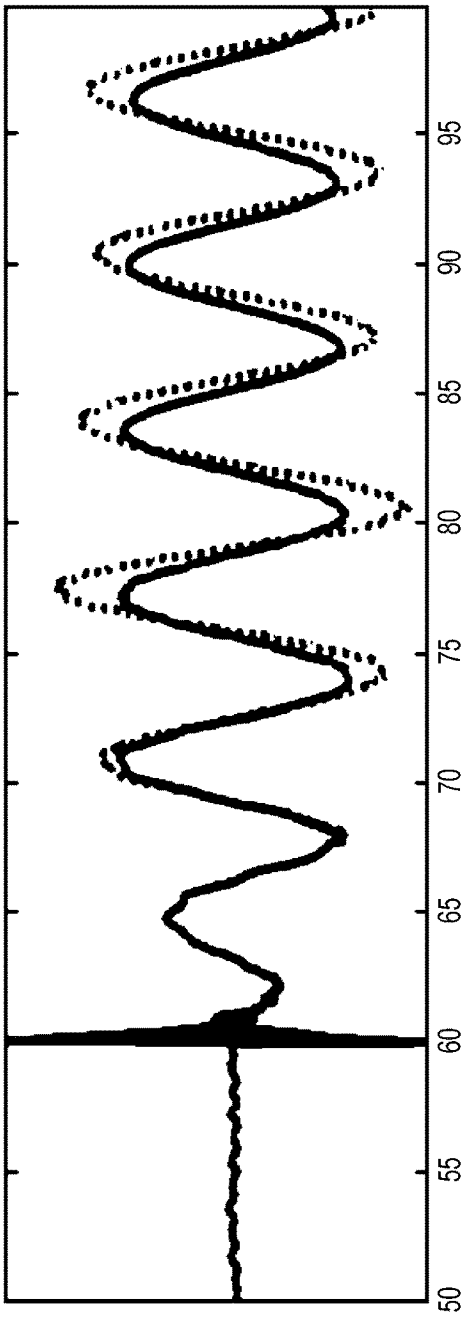
FIGS. 5-8 are graphical views showing simulated results of the occurrence of an imbalance event in a baseline wind turbine and in a wind turbine controlled in accordance with an embodiment of the invention.

The graph depicted by FIG. 5 has a vertical axis corresponding to a side-to-side tower-top acceleration, and a horizontal axis corresponding to time. The transient at t=60 seconds emerges from the introduction of a rotor imbalance involving an instantaneous change in the rotor. As can be seen by comparing the solid and dashed plots, use of azimuth-domain imbalance detection provides a significant reduction in peak acceleration as compared to the baseline system.

Figure 6:
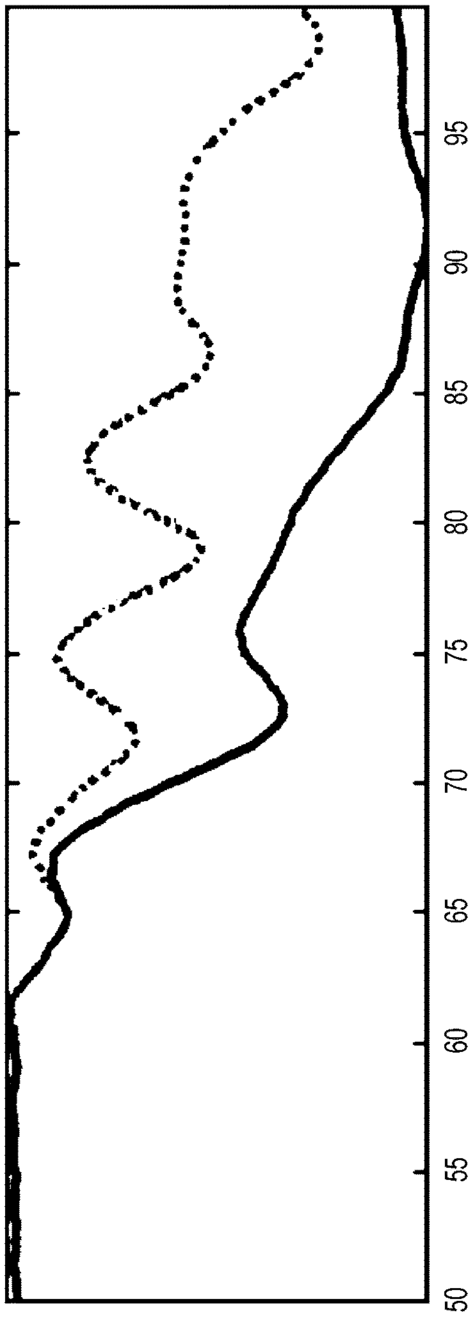

The graph depicted by FIG. 6 has a vertical axis corresponding to rotor speed, and a horizontal axis corresponding to time. As can be seen by comparing the solid and dashed plots, use of azimuth-domain imbalance detection provides a faster reduction in rotor speed as compared to the baseline system.

Figure 7:
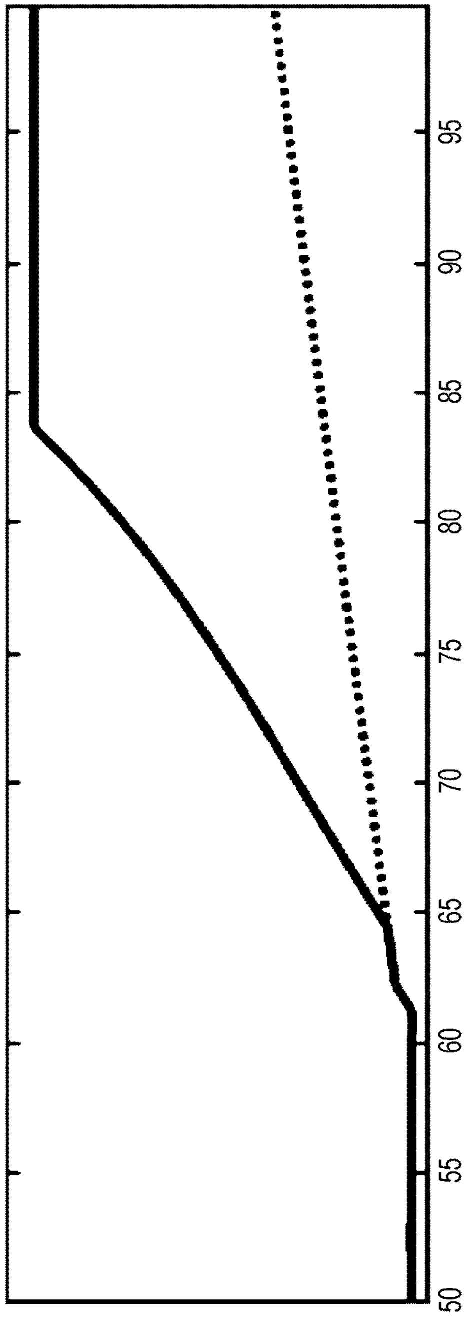

The graph depicted by FIG. 7 has a vertical axis corresponding to blade pitch angle, and a horizontal axis corresponding to time. As can be seen by comparing the solid and dashed plots, when a rotor imbalance is detected, fast pitching is enforced, resulting in faster reduction of rotor speed.

Figure 8:
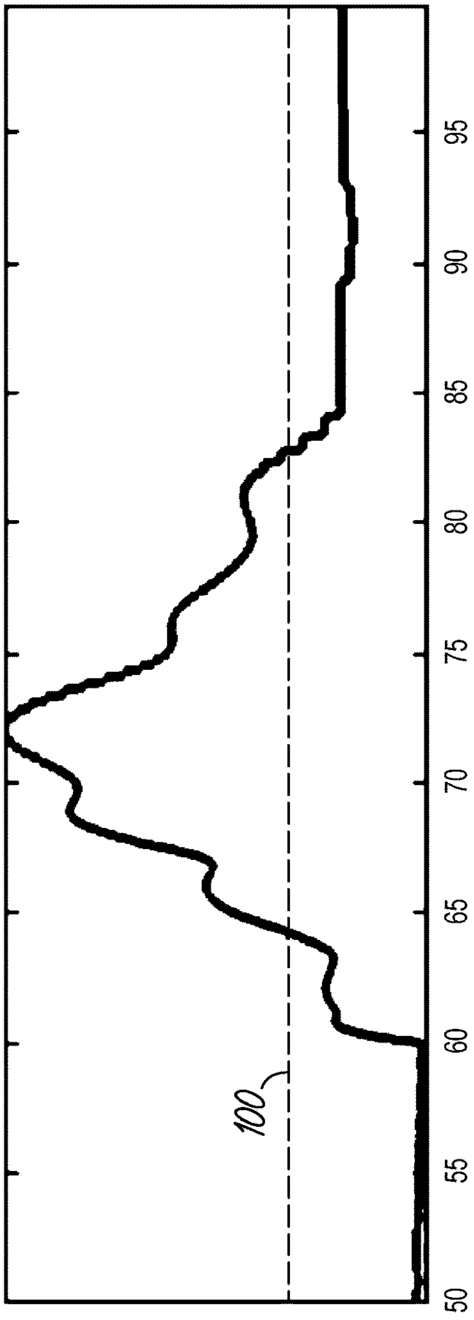

The graph depicted by FIG. 8 has a vertical axis corresponding to a magnitude of the fundamental inverse-angle component, a horizontal axis corresponding to time, and a threshold indicated by horizontal line 100. The graph shows that the selected threshold 100 triggered fast pitching within 5 seconds of the imbalance event.

Figure 9:
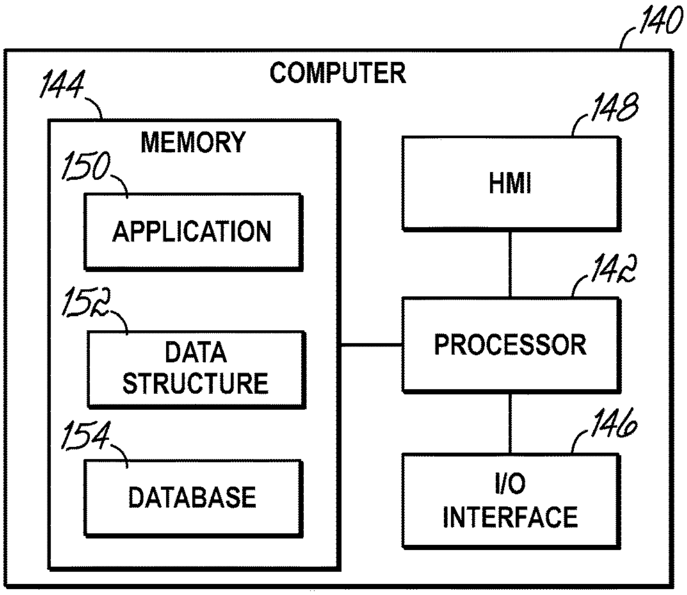
FIG. 9 is a diagrammatic view of a computer that may be used to implement one or more of the systems or processes depicted in or described by FIGS. 1-8.

Referring now to FIG. 9, embodiments of the invention described above, or portions thereof, may be implemented using one or more computer devices or systems, such as exemplary computer 140. The computer 140 may include a processor 142, a memory 144, an input/output (I/O) interface 146, and a Human Machine Interface (HMI) 148. The processor 142 may include one or more devices that manipulate signals based on operational instructions that are stored in memory 144. The processor 142 may execute computer program code embodied as one or more applications 150 residing in memory 144. One or more data structures 152 may also reside in memory 144, and may be used by the processor 142 or application 150 to store or manipulate data.

The I/O interface 146 may provide a machine interface that operatively couples the processor 142 to other devices and systems. The application 150 may thereby work cooperatively with one or more external resources to provide the various features, functions, applications, processes, or modules comprising embodiments of the invention. The HMI 148 may be operatively coupled to the processor 142 of computer 140 to allow a user to interact directly with the computer 140. To this end, the HMI 148 may include output devices capable of providing data to the user, and input devices capable of accepting input from the user.

A database 154 may reside in memory 144, and may be used to collect and organize data used by the various systems and modules described herein. The database 154 may include data and supporting data structures that store and organize the data. A database management system in the form of an application executing on the processor 142 may be used to access the information or data stored in records of the database 154 in response to a query.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

The invention claimed is:

1. A method for detecting an occurring imbalance in a pitchable rotor of a wind turbine during operation, comprising:

measuring a dynamic characteristic of the wind turbine;

defining a sequence of dynamic values $(a(\psi)))$ by sampling the dynamic characteristic when the rotor is at each of a plurality of azimuth angles $(\psi_n)$, the sequence of dynamic values includes dynamic values obtained for the immediate at least one full rotation prior to a current azimuth angle of the rotor;

applying an azimuth-domain transform to the sequence of dynamic values $(a(\psi)$ to generate at least one inverse-angle component $(A(\gamma_k))$;

detecting the imbalance based on the at least one inverse-angle component $(A(\gamma_k))$; and initiating a pitching of the pitchable rotor to stop the rotation of the rotor.

2. The method of claim 1, wherein the at least one inverse-angle component $(A(\gamma_k))$ is a fundamental inverse-angle component $(A(\gamma_k))$, and detecting the imbalance comprises:

comparing a value of the fundamental inverse-angle component $(A(\gamma_k))$ to a fundamental inverse-angle threshold; and determining the imbalance exists in response to the value of the fundamental inverse-angle component $(A(\gamma_k))$ exceeding the fundamental inverse-angle threshold.

3. The method of claim 1, wherein the at least one inverse-angle component $(A(\gamma_k))$ is a fundamental inverse-angle component $(A(\gamma_k))$, and detecting the imbalance comprises:

determining a difference between a current value of the fundamental inverse-angle component $(A(\gamma_k))$ and a previous value of the fundamental inverse-angle component $(A(\gamma_k))$;

comparing the difference to a fundamental inverse-angle rate of change threshold; and determining the imbalance exists in response to the value of the difference exceeding the fundamental inverse-angle rate of change threshold.

4. The method according to claim 1, further comprising:

updating the sequence of dynamic values $(a(\psi))$ by adding a new dynamic value $(a(\psi_n))$ to the sequence of dynamic values $(a(\psi))$ and removing an oldest dynamic value $(a(\psi_n))$ from the sequence of dynamic values $(a(\psi))$ each time the rotor reaches one of the plurality of azimuth angles $(\psi_n)$.

5. The method according to claim 1, wherein the number of dynamic values $(a(\psi_n))$ in the sequence of dynamic values $(a(\psi))$ is equal to an integer multiple of the number of azimuth angles $(\psi_n)$ in one full rotation of the rotor.

6. The method according to claim 1, wherein the dynamic characteristic includes a component aligned with a rotor plane of the rotor.

7. The method according to claim 1, wherein each dynamic value is a measured acceleration of a nacelle of the wind turbine.

8. The method according to claim 1, further comprising:

in response to detecting the imbalance, pitching one or more blades of the rotor toward a feathered position in accordance with a selected pitch trajectory.

9. The method of any of claim 1, further comprising:

in response to detecting the imbalance, adjusting a blade pitch rate from a first rate to a second rate higher than the first rate.

10. The method according to claim 1, wherein the pitching of the pitchable rotor to stop the rotation of the rotor is handled by a safety control system.

11. A system for detecting an occurring imbalance in a pitchable rotor of a wind turbine, comprising:

one or more processors; and a memory coupled to the one or more processors and including program code that, when executed by the one or more processors, causes the system to perform an operation, comprising:

measure a dynamic characteristic of the wind turbine;

define a sequence of dynamic values ($a(\psi)$) by sampling the dynamic characteristic when the rotor is at each of a plurality of azimuth angles ($\psi_n$), the sequence of dynamic values includes dynamic values obtained for the immediate at least one full rotation prior to a current azimuth angle of the rotor;

apply an azimuth-domain transform to the sequence of dynamic values ($a(\psi)$ to generate at least one inverse-angle component ($A(\gamma_k)$);

detect the imbalance based on the at least one inverse-angle component ($A(\gamma_k)$); and initiate a pitching of the pitchable rotor to stop the rotation of the rotor.

12. The system of claim 11, wherein the at least one inverse-angle component ($A(\gamma_k)$) is a fundamental inverse-angle component ($A(\gamma_k)$), and detect the imbalance comprises:

compare a value of the fundamental inverse-angle component ($A(\gamma_k)$) to a fundamental inverse-angle threshold; and determine the imbalance exists in response to the value of the fundamental inverse-angle component ($A(\gamma_k)$) exceeding the fundamental inverse-angle threshold.

13. The system of claim 11, wherein the at least one inverse-angle component ($A(\gamma_k)$) is a fundamental inverse-angle component ($A(\gamma_k)$), and detecting the imbalance comprises:

determine a difference between a current value of the fundamental inverse-angle component ($A(\gamma_k)$) and a previous value of the fundamental inverse-angle component ($A(\gamma_k)$);

compare the difference to a fundamental inverse-angle rate of change threshold; and determine the imbalance exists in response to the value of the difference exceeding the fundamental inverse-angle rate of change threshold.

14. A computer program product for detecting an occurring imbalance in a rotor of a wind turbine, comprising:

a non-transitory computer-readable storage medium; and program code stored on the non-transitory computer-readable storage medium that, when executed by one or more processors, causes the one or more processors to perform an operation, comprising:

measure a dynamic characteristic of the wind turbine;

define a sequence of dynamic values ($a(\psi)$) by sampling the dynamic characteristic when the rotor is at each of a plurality of azimuth angles ($\psi_n$), the sequence of dynamic values includes dynamic values obtained for the immediate at least one full rotation prior to a current azimuth angle of the rotor;

apply an azimuth-domain transform to the sequence of dynamic values ($a(\psi)$) to generate at least one inverse-angle component ($A(\gamma_k)$);

detect the imbalance based on the at least one inverse-angle component ($A(\gamma_k)$); and initiate a pitching of the pitchable rotor to stop the rotation of the rotor.

15. The computer program product of claim 14, wherein the at least one inverse-angle component ($A(\gamma_k)$) is a fundamental inverse-angle component ($A(\gamma_k)$), and detecting the imbalance comprises:

compare a value of the fundamental inverse-angle component ($A(\gamma_k)$) to a fundamental inverse-angle threshold; and determine the imbalance exists in response to the value of the fundamental inverse-angle component ($A(\gamma_k)$) exceeding the fundamental inverse-angle threshold.

16. The computer program product of claim 14, wherein the at least one inverse-angle component ($A(\gamma_k)$) is a fundamental inverse-angle component ($A(\gamma_k)$), and detecting the imbalance comprises:

determine a difference between a current value of the fundamental inverse-angle component ($A(\gamma_k)$) and a previous value of the fundamental inverse-angle component (4 ($\gamma_k$));

compare the difference to a fundamental inverse-angle rate of change threshold; and determine the imbalance exists in response to the value of the difference exceeding the fundamental inverse-angle rate of change threshold.

* * * * *